United States Patent
Hintermeister et al.

(10) Patent No.: US 9,705,814 B2
(45) Date of Patent: Jul. 11, 2017

(54) NETWORK APPLIANCE MAPPING (71) Applicant: LENOVO ENTERPRISE SOLUTIONS (SINGAPORE) PTE. LTD., Singapore (SG)

(72) Inventors: Gregory R. Hintermeister, Rochester, MN (US); Susette Townsend, Rochester, MN (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 276 days.

(21) Appl. No.: 14/289,934

(22) Filed: May 29, 2014

(65) Prior Publication Data

US 2015/0180797 A1 Jun. 25, 2015

Related U.S. Application Data (63) Continuation of application No. 14/135,715, filed on Dec. 20, 2013.

(51) Int. Cl.
*H04L 12/24* (2006.01)
*H04L 12/911* (2013.01)
*G06F 9/44* (2006.01)

(52) U.S. Cl.
CPC ............ *H04L 47/70* (2013.01); *G06F 9/4443* (2013.01); *H04L 41/20* (2013.01); *H04L 41/22* (2013.01)

(58) Field of Classification Search
CPC ....... G06F 9/4443; H04L 47/70; H04L 41/20; H04L 41/22

USPC .......................................... 709/226
See application file for complete search history.

(56) References Cited

U.S. PATENT DOCUMENTS

| | | | |
|---|---|---|---|
| 6,611,275 B1 | 8/2003 | Zey et al. | |
| 9,077,627 B2 | 7/2015 | Bonas | |
| 9,294,359 B2 | 3/2016 | Cisler et al. | |
| 2005/0210152 A1 | 9/2005 | Hawes | |
| 2007/0067381 A1 | 3/2007 | Grant, Jr. et al. | |
| 2007/0233854 A1 | 10/2007 | Bukovec et al. | |
| 2008/0147827 A1* | 6/2008 | Morris | H04L 12/2821 709/220 |
| 2008/0256237 A1 | 10/2008 | Liu | |
| 2010/0122175 A1* | 5/2010 | Gupta | H04L 41/22 715/735 |
| 2012/0036442 A1 | 2/2012 | Dare et al. | |
| 2013/0055155 A1 | 2/2013 | Wong et al. | |

OTHER PUBLICATIONS

Hintermeister et al., "Network Appliance Mapping", U.S. Appl. No. 14/135,715, filed Dec. 20, 2013.

* cited by examiner

*Primary Examiner* — Wing F Chan
*Assistant Examiner* — Leon Y Tseng
(74) *Attorney, Agent, or Firm* — Patterson + Sheridan, LLP (57) ABSTRACT

The present disclosure includes a method that includes, by a solution appliance configured to administer resources in response to authorized users selecting tasks presented in a user interface, receiving an indication of a status change for a functional appliance configured to provide at least one of the resources, accessing a resource map that links the resources to the tasks, and indicating the status change for the functional appliance on the user interface based on the resource map.

20 Claims, 4 Drawing Sheets

NETWORK APPLIANCE MAPPING

TECHNICAL FIELD

This disclosure relates to network appliance mapping. In particular, it relates to network appliance mapping of appliance status information to user interfaces.

BACKGROUND

Enterprise systems may utilize discrete functional appliances, both physical and virtual, to deliver specific capabilities. The presentation and direction of these functional appliances may be aggregated into a solution appliance. The solution appliance may provide a user interface for administrators to control the enterprise system, while the functional appliances may perform the workload for the enterprise system. The solution appliance may communicate with the functional appliances through application programming interfaces.

SUMMARY

The present disclosure includes a method that includes, by a solution appliance configured to administer resources in response to authorized users selecting tasks presented in a user interface, receiving an indication of a status change for a functional appliance configured to provide at least one of the resources, accessing a resource map that links the resources to the tasks, and indicating the status change for the functional appliance on the user interface based on the resource map.

The present disclosure also includes a system with appliance status feedback, comprising a solution appliance configured to administer resources in response to authorized users selecting tasks presented in user interfaces, receive an indication of a status change for a functional appliance configured to provide at least one of the resources, access a resource map that links the resources to the tasks, and indicate the status change for the functional appliance on the user interface based on the resource map.

The present disclosure also includes a method for displaying user capability that includes, by a solution appliance configured to administer a resource, detecting a functional appliance configured to provide the resource to the solution appliance, mapping the resource to the functional appliance, and assigning access to status information of the functional appliance for a user role having permission to utilize the resource from the function appliance.

BRIEF DESCRIPTION OF THE DRAWINGS

The drawings included in the present application are incorporated into, and form part of, the specification. They illustrate embodiments of the present invention and, along with the description, serve to explain the principles of the invention. The drawings are only illustrative of typical embodiments of the invention and do not limit the invention.

DETAILED DESCRIPTION

A distributed computer system may provide services to users. A functional and operational system requires maintenance of the system hardware and administration of the services to users. The system may be managed and administered by a number of administrators having specific roles. For example, a system administrator may maintain the hardware and perform firmware updates, while a solution administrator may manage user profiles and administer applications to users. Such division of administrative tasks compartmentalizes responsibility and access to elements of the system.

This division of administrative responsibilities may cause communication problems if information is not adequately shared among appliances and users of the system. For example, a storage appliance that provides database storage may be taken offline for an update by a systems administrator. If given advanced notice, a solution administrator may be aware of the system update and may suspend any tasks provided to a user group that utilize the storage appliance until the update has been completed. Without notice, the solution manager may be unaware of the status of the storage appliance. Users may not be able to perform the task that relies on the functional appliance and the solution administrator may not know which functional appliance is the responsible functional appliance and when the functional appliance may be available.

According to embodiments of the disclosure, a solution appliance may collect status information from functional appliances and display system information on user interfaces to selected user. The solution appliance may map the functional appliances and determine the effects of the functional appliances on tasks and actions administered by the solution appliance and displayed on user interfaces. The user interfaces may reflect the operational status of tasks and functional appliances associated with the system, such as future offline conditions, current offline conditions, and estimated time of offline conditions. A service processor may be available to communicate status information from a functional appliance to the solution appliance through an out-of-band network. A solution administrator may receive functional appliance status information and determine how it affects particular tasks and particular users.

Consistent with embodiments, the appliance system can be configured to determine the effect of a status change of a functional appliance upon relatively complex user interfaces. For instance, the user interfaces may include a number of components that are dependent upon functional appliances, such as multiple views with different data or graphical displays, menu options for carrying out a related function, or configuration settings and query tools. The dependencies of these interface components upon one or more functional appliances can be hidden from a user. Accordingly, certain embodiments allow for the solution appliance to create and maintain mappings between the user interfaces and the functional appliances. For instance, the solution appliance can use a solution map that identifies the user interface components and locations that a selected appliance provides content to the solution. Using such mapping, the solution appliance can present a visual depiction of the effect of a functional appliance status to a particular user interface. This can include a preview of the effect of a possible, future status change or the effect of a current status.

Figure 1:
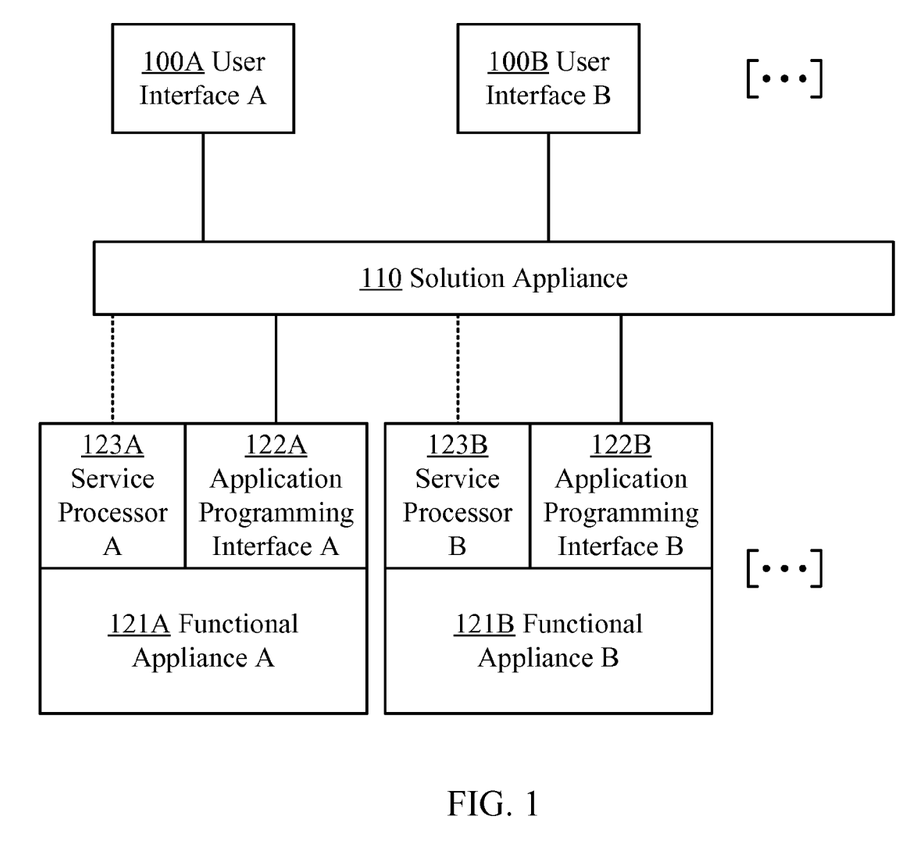
FIG. 1 is a diagram of an appliance network capable of communicating and displaying status information to user interfaces, according to embodiments of the disclosure.

FIG. 1 is a diagram of an appliance network capable of communicating and displaying status information to user interfaces, according to embodiments of the disclosure. One or more functional appliances 121 (functional appliance A 121A and functional appliance B 121B shown here) may provide resources or services to a solution appliance 110. A functional appliance 121 may be hardware or software configured to provide a resource to the appliance network. In some embodiments, a functional appliance 121 may be a discrete hardware appliance configured with software or firmware to supply a specific resource. The resources or services supplied by each functional appliance may be a variety of functional computing resources or services for which the functional appliance 121 is specifically configured, such as storage, processing, or communication. Each functional appliance 121 may communicate with the solution appliance 110 through one or more application programming interfaces 122 (application programming interface A 122A for functional appliance A 121A and application programming interface B 122B for functional appliance B 121B shown here). The solution appliance 110 may map resources provided by each functional appliance 121 to the solution appliance 110 and associate each functional appliance 121 with the tasks administered to and performed by users through user interfaces.

A functional appliance 121 may provide status information to the solution appliance 110. Status information for the functional appliance 121 may include information regarding the past, current, or future operational status of the functional appliance. This status information may be provided to the solution appliance 110 through a network using the application programming interfaces 122. Alternately, the status information may be communicated to the solution appliance 110 through an out-of-band network. If the functional appliance 121 has been taken offline and is incapable of communicating with the solution appliance 110 due to its offline status, an optional service processor 123 (service processor A 123A for functional appliance A 121A and service appliance B 123B for functional appliance B 121B shown here) attached to the functional appliance 121 may still communicate its status information to the solution appliance 110 through the out-of-band network.

The solution appliance 110 may be hardware or software configured to administer tasks and display system information to users through one or more user interfaces 100 (user interface A 100A and user interface B 100B shown here). The solution appliance 110 may provide different user interfaces (UI) to users according to user role and permission. Each UI may have UI elements that may display information and provide inputs for actions depending on the particular user. Users with responsibility for certain tasks and appliances may see information and perform actions that directly pertain to their responsibilities without extra information. A user interface 100 may be hardware or software configured to receive information from the solution appliance and display the information on a hardware device. In some embodiments, a user interface 100 may be computer hardware with software configured to receive information from the solution appliance and display the information, such as a remote computer communicating with the solution appliance through a web browser with APIs. In other embodiments, a user interface 100 may be hardware having customizable logic configured to receive and display data from the solution appliance 110.

Consistent with embodiments and as relevant to potential user actions, a user interface can include a variety of different components that may provide for selectable functions or options, displayable portions, different views of data and configuration options. One or more of these components of the user interface may be dependent upon the availability of a functional appliance. Consistent with various embodiments, the solution appliance can generate a visual display to indicate that one or more components are inaccessible, operating at reduced capacity, or scheduled for down time, each due to a change in functional appliance status. Consistent with certain embodiments, the display could be a popup that is displayed in response to a mouse-over event or selection event.

Each user interface 100 may be customized for a particular user based on the responsibilities, tasks, and permissions assigned to that user. Status information may be displayed on user interfaces (UI) in a variety of ways according to the corresponding user's responsibilities. In an embodiment, functional appliance status information may be displayed on a solution administrator UI or a system administrator UI in an appliance impact view. If the status of a functional appliance has changed or will change, the solution appliance may analyze the resource map of the functional appliance to determine the resources and tasks supplied by that functional appliance. Tasks, actions, and users affected by the functional appliance may be displayed to the solution administrator. For example, users affected by the functional appliance may be highlighted in green to indicate that their user interfaces will be affected. As another example, in a previewing or troubleshooting environment, a user interface for an affected or potentially affected user may be previewed or highlighted by the solution administrator. Similarly, a system admin user interface may display affected users, tasks, and solution appliances to the system administrator during an update of the functional appliance. The system administrator may log into the service processor of the functional appliance and determine, from the system admin user interface, which solution appliances are requesting resources from the functional appliance and which tasks are scheduled for the functional appliance.

In another embodiment, functional appliance status information may be displayed on a user interface in first person impact view to communicate real-time and future operational information. A guest user interface may indicate a current or future status for a task assigned to the guest and affected by a current or future offline functional appliance. For example, if a functional appliance is offline, a button or prompt used to perform the task may be inoperable and may display a "currently offline" color indication or an estimated online time for the task. If the functional appliance is not yet offline, the task button or prompt may display a "soon to be offline" color indication or an estimated offline time for the task. A solution admin user interface may indicate an offline condition for the functional appliance, but may have different features disabled than the guest user interface, such as a button or prompt that assigns a service from a functional appliance to a user. In this way, different user interface elements may use the same status information to indicate different capabilities as they pertain to a particular user interface.

In another embodiment, functional appliance status information may be simulated to preview a future functional appliance. The solution appliance may have a registration application programming interface which allows a new functional appliance to register before installation. The solution appliance may create the resource map of the functional appliance to determine the resources and tasks supplied by the functional appliance. For a guest user interface, a guest may view an indication of a task performed by the future functional appliance, such as a task button or prompt, or information associated with the new task, such as an instructional video. For a solution administrator user interface, the solution administrator may view the resource map of the functional appliance to identify its capabilities.

Figure 2:
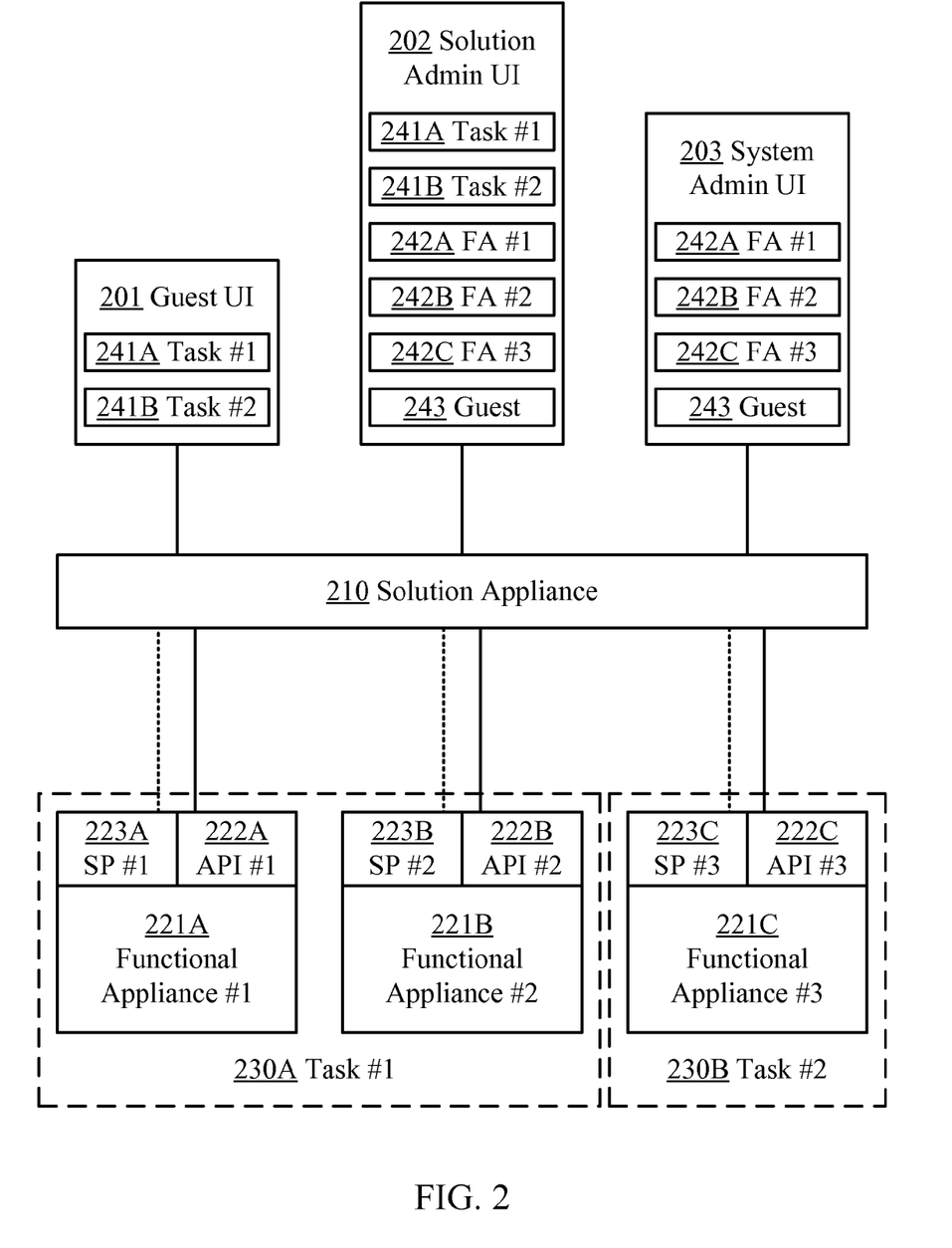
FIG. 2 is a diagram of an appliance network, according to embodiments of the disclosure.

FIG. 2 is a diagram of an example appliance network, according to embodiments of the disclosure. In this example, three functional appliances 221A, 221B, and 221C each may provide one or more resources to a solution appliance 210. Each functional appliance 221 has an application programming interface 222A, 222B, and 222C for communicating with the solution appliance 210. Optionally, each functional appliance 221 has a service processor 223A, 223B, and 223C connected to the solution appliance 210 through an out-of-band network for communicating status information to the solution appliance 210.

The solution appliance 210 may administer task #1 230A and task #2 230B to guests. Functional appliance #1 221A and functional appliance #2 221B may be used for task #1 230A and functional appliance #3 221C may be used for task #2 230B. The functional appliances 221 may communicate their state to the solution appliance 210, and the solution appliance 210 may process and share that status information with authorized users through user interfaces.

A guest may be assigned to perform task #1 230A and task #2 230B and may be provided with a guest UI 201 displaying a task #1 UI element 241A and a task #2 UI element 241B. A solution administrator/deployer 202 may assign user roles to different users which include performance of permissible tasks 230 by a user. The system administrator may be provided with a system admin user interface 202 displaying a task #1 user element 241A, a task #2 user element 241B, a functional appliance #1 UI element 242A, a functional appliance #2 UI element 242B, a functional appliance #3 UI element 242C, and a guest UI element 243. A system administrator 203 may have ownership of the functional appliances 221, including updates of the functional appliances 221. The system administrator may be provided with a system admin UI 203 displaying a functional appliance #1 UI element 242A, a functional appliance #2 UI element 242B, a functional appliance #3 UI element 242C, and a guest UI element 243.

Each UI element may communicate status information to a user through a particular user interface in a way that is customized for the actions of the user. For example, a task UI element 241 on the guest user interface 201 may include a button or prompt for performance of the task and a status indication regarding the status of the task. A task UI element 241 on the solution administrator user interface 202 may include a menu indicating status of the task and the users assigned to the task. In this way, information may be presented to a user on a user interface in a way that directly pertains to the user's function and permission.

As an illustration, if the system administrator plans to take functional appliance #2 221B offline in a half hour for a one hour update, functional appliance #2 221B may communicate to the solution appliance 210 that it will be taken offline in a half hour for the update. The solution appliance 210 may estimate the amount of time the update will take and may determine an estimated return time for functional appliance #2 221B.

Continuing with the illustration, the solution appliance 210, through the solution administrator 202 or through software in the solution appliance 210, may determine through a resource map that task #1 is associated with functional appliance #2 221B and displayed on task #1 UI element 241A. The solution appliance 210 may communicate to the system administrator, who is responsible for administering resources from functional appliance #2, and the solution administrator, who is responsible for functional appliance #2, that functional appliance #2 221B will be offline in a half hour for one hour. This information may be displayed on the functional appliance #2 UI element 242B on the solution admin UI 202 and the system admin UI 203.

The solution appliance 210 may also communicate to the guest, who has been assigned task #1 230A, and the solution administrator that task #1 230A may not be able to be performed in a half hour for an estimated one hour. This information may be displayed on a task #1 UI element 241A on the guest UI 201 and the solution admin UI 202. Additionally, the solution admin UI 202 or the system admin UI 203 may display on a guest UI element 243 that the guest user interface 201 will be affected by functional appliance #2 221 going offline.

Figure 3:
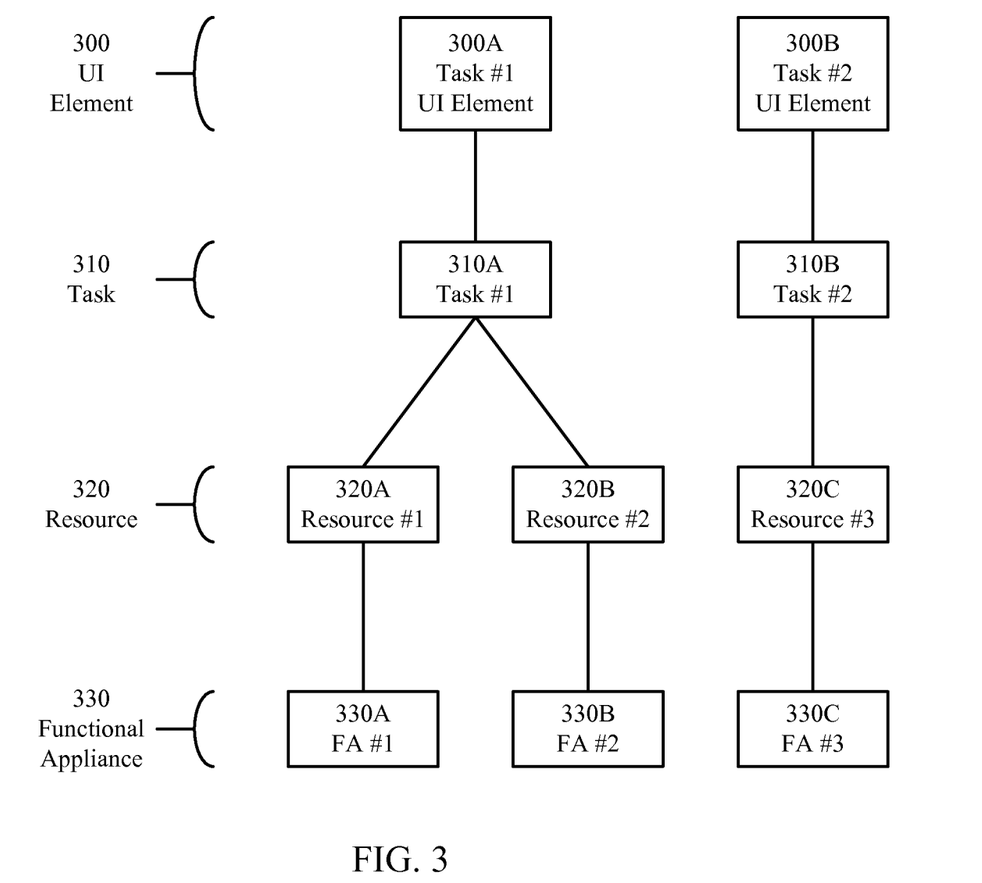
FIG. 3 is resource map of the diagram of FIG. 2, according to embodiments of the disclosure.

FIG. 3 is resource map of the example of FIG. 2, according to embodiments of the disclosure. This resource map may provide a solution administrator, as system administrator, or a solution appliance with information regarding how each functional appliance directly affects users of the system, so that the corresponding user interface may receive operational and status information at a level for which the user can use. In this example, task #1 310A is assigned resource #1 320A and resource #2 320B, which are provided by functional appliance #1 330A and functional appliance #2 330B, respectively. Task #2 310B is assigned resource #3 320C, which is provided by functional appliance #3 330C. Information and actions regarding task #1 310A may be associated with user interface element 300A, while information and actions regarding task #2 310B may be associated with user interface element 300B.

Figure 4:
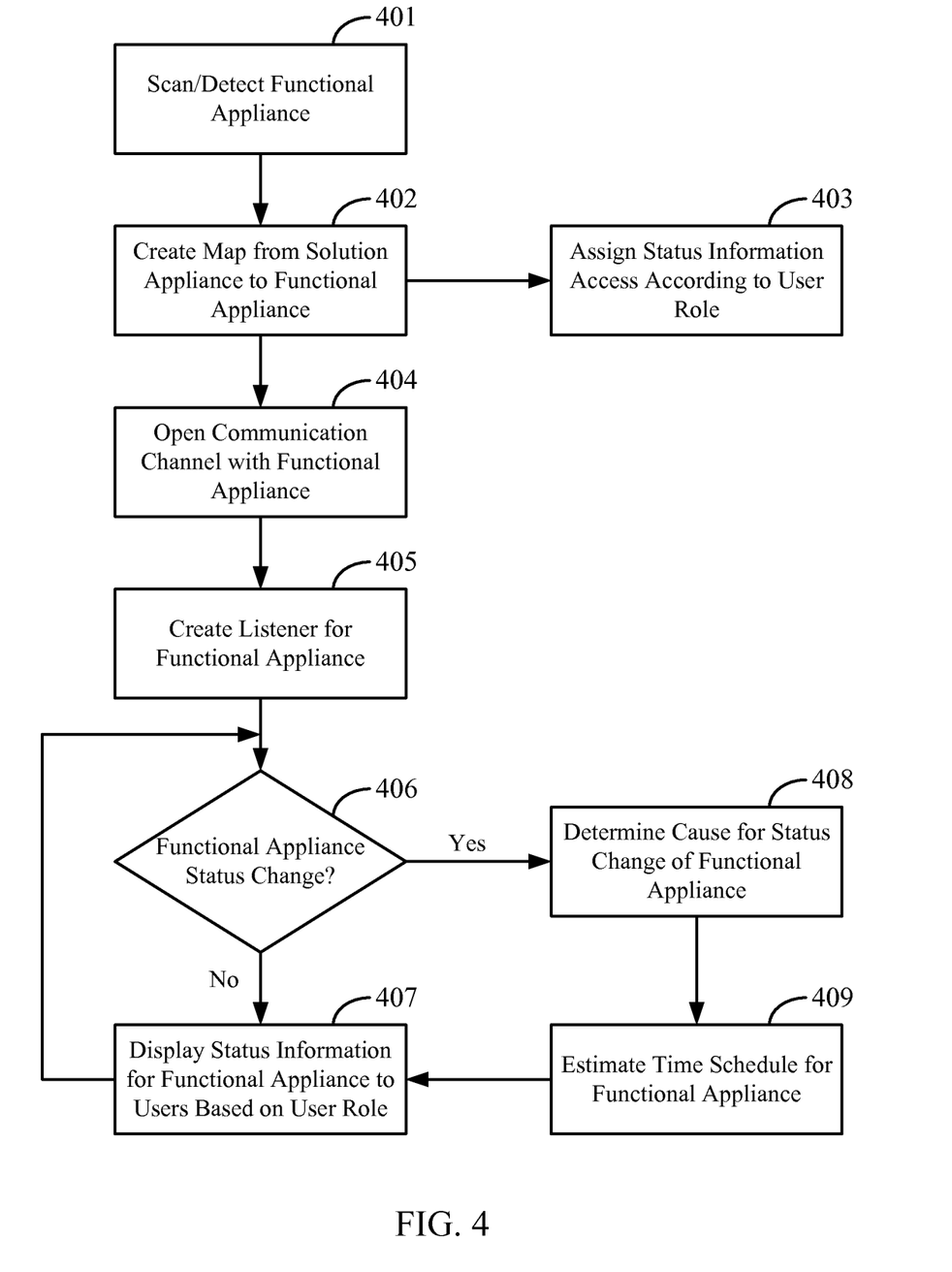
FIG. 4 is a flowchart for establishing a status communication and interpretation system with a solution appliance, according to embodiments of the disclosure.

FIG. 4 is a flowchart for establishing a status communication and interpretation system with a solution appliance, according to embodiments of the disclosure. A solution appliance may detect a functional appliance in the system, such as by scanning API activity from one or more functional appliances in an appliance network, as in 401. The solution appliance may create a resource map from the functional appliances to the solution appliance, as in 402. This resource map associates resources provided by the functional appliance with tasks administered by the solution appliance for users through user interfaces. The solution appliance may assign tasks and corresponding system status information to users according to user role, as in 403. The solution appliance may assign users to the user roles according to a user directory, which may include task and permission information for a user role.

The solution appliance may open a communication channel with one or more functional appliances for communicating status information from the functional appliances to the solution appliance, as in 404. The solution appliance creates a listener in the communication channel, as in 405, through which the functional appliances may communicate status information, as in 406. Status information collected from the functional appliances may include the current appliance status, future appliance status changes, and causes for future appliance status changes. The solution appliance may display status information to user interfaces according to the users' sophistication and permission level. The status information displayed on the user interfaces includes status information about the functional appliance and status information of actions related to the functional appliance. For example, the solution appliance may display the direct status of the functional appliance and its estimated return time to administrators, and may also display the status of any tasks associated with the functional appliance and their return time to both administrators and system users authorized to perform the tasks. If a functional appliance does change state, the solution appliance may determine the cause for the change of state, such as an update, a pending update, or loss of power, as in 408. The solution appliance may estimate the amount of time the functional appliance will be offline or the timetable or time schedule for the functional appliance or corresponding task going offline, as in 409, and display this status information to users, as in 407. The time schedule may include the time until the functional appliance or task may be offline and the time the functional appliance or task will be offline.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be but is not limited to, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium including, but not limited to, wireless, wire line, optical fiber cable, RF, etc., or any suitable combination of the foregoing.

Computer program code for carrying out operations for aspects of the present disclosure may be written in any combination of one or more programming languages, including an object-oriented language such as Java, Smalltalk, C++, or the like, and conventional procedural programming languages, such as "C" programming language or similar programming languages. The program code may execute entirely on the user's computer, partly on the user's computer, as a standalone software package, partly on the user's computer and partly on a remote computer or server, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other device to cause a series of operational steps to be performed on the computer, other programmable apparatus, or other device to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods, and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Although the present disclosure has been described in terms of specific embodiments, it is anticipated that alterations and modifications thereof will become apparent to those skilled in the art. Therefore, it is intended that the following claims be interpreted as covering all such alterations and modifications as fall within the true spirit and scope of the disclosure.

What is claimed is:

1. A solution appliance with appliance status feedback, the solution appliance comprising:
   one or more computer processors;
   a memory containing a program which, when executed by the one or more computer processors, performs an operation comprising:
   administering resources in response to selection of tasks presented on a user interface, the resources including a first resource provided by a functional appliance to the solution appliance for administration, wherein the functional appliance and the solution appliance are manageable by distinct administrators including a system administrator and a solution administrator, respectively;
   assigning the first resource for use by a specified task of a guest user, the guest user having a guest user role that includes permission to use the first resource from the functional appliance;
   assigning, to the guest user role, access to status information of the functional appliance;
   upon receiving an indication of a status change of the functional appliance accessing a resource map linking the resources to the tasks, in order to identify an impact of the status change; and
   generating an indication of the identified impact of the status change, whereafter the indication is output via the user interface.

2. The solution appliance of claim 1, the operation further comprising:
   opening a communication channel with the functional appliance; and
   receiving status information from the functional appliance.

3. The solution appliance of claim 2, wherein the functional appliance is operable to send the status information to the solution appliance.

4. The solution appliance of claim 3, wherein the functional appliance:
   is operable to send and receive data through a first network; and
   contains a service processor operable to:
   function while the functional appliance is otherwise offline; and
   send the status information to the solution appliance through a second network, wherein the second network is not the same as the first network.

5. The solution appliance of claim 1, wherein the impact specifies at least one of: (i) one or more impacted tasks and (ii) one or more impacted users, including the guest user; wherein the operation further comprises, prior to receiving indication of the status change:
   upon detecting that the functional appliance is operable to provide the first resource for use by one or more tasks, mapping the first resource to the functional appliance, the one or more tasks including the specified task.

6. The solution appliance of claim 5, wherein the solution appliance is operatively connected to a plurality of functional appliances including the functional appliance;
   wherein the selection of tasks is based on user input from the solution administrator, wherein the user interface is specific to a solution administrator role, wherein the specified task comprises a first of a plurality of tasks, wherein the operation further comprises:
   conveying, via a respective role-specific user interface, respective role-specific status information to a respective user of each role selected from the guest user role, the solution administrator role, and the system administrator role.

7. The solution appliance of claim 6, wherein conveying the status information includes:
   conveying status information of the plurality of tasks to the guest user, the status information indicating a change to availability of the specified task as a result of the status change of functional appliance;
   conveying status information of the solution appliance to the solution administrator, including tasks and resources administered by the solution appliance, the status information indicating a change to availability of the functional appliance and tasks affected by the functional appliance; and
   conveying status information of the functional appliance to the system administrator, including tasks using resources provided by the functional appliance, the resources including the first resource, the status information indicating the guest user as being a user affected by the status change of the functional appliance.

8. The solution appliance of claim 7, wherein the solution appliance is operatively connected to each of the plurality of functional appliances via both: (i) an in-band network and (ii) an out-of-band network;
   wherein each functional appliance has a main processor and a service processor, wherein the service processor is operable to transmit status information to the solution appliance via the out-of-band network both: (i) when the in-band network is offline and (ii) when the main processor is offline.

9. The solution appliance of claim 8, wherein the operation further comprises:
   opening a communication channel with the functional appliance;
   receiving status information from the functional appliance, wherein the status change comprises an offline condition for the functional appliance;
   determining a cause of the offline condition;
   determining a time schedule for the offline condition based on the cause of the offline condition;
   displaying the time schedule for the offline condition on the user interface to indicate the change to availability of the functional appliance; and
   mapping the specified task administered by the solution appliance to the first resource administered by the solution appliance.

10. The solution appliance of claim 9, wherein the operation further comprises:
    creating the guest user role having permission to use the first resource from the functional appliance;
    assigning the guest user role to the guest user;
    receiving a request for access by the guest user;
    querying a user directory for the guest user; and
    identifying the guest user as having the guest user role.

11. The solution appliance of claim 10, wherein the guest user is assigned permission to use the first resource, including permission to perform the specified task;
  wherein the solution administrator is assigned permission to use the first resource, including permission to assign the specified task to users;
  wherein the system administrator is assigned permission to use the first resource, including permission to determine: (i) one or more solution appliances contacting the functional appliance and (ii) one or more tasks that the functional appliance is scheduled to execute;
  wherein each impact type is specifiable by the impact, selected from: (i) the one or more impacted tasks and (ii) the one or more impacted users.

12. A computer-implemented method to provide appliance status feedback, the computer-implemented method comprising:
  by a solution appliance configured to administer resources in response to a selection of tasks presented in a user interface, the resources including a first resource provided by a functional appliance to the solution appliance for administration:
    assigning the first resource for use by a specified task of a guest user, the guest user having a guest user role that includes permission to use the first resource;
    assigning, to the guest user role, access to status information of the functional appliance;
    upon receiving an indication of a status change of the functional appliance, accessing, by operation of one or more computer processors, a resource map linking the resources to the presented tasks, in order to identify an impact of the status change; and
    generating an indication of the identified impact of the status change,
  whereafter the indication is output via the user interface;
  wherein the functional appliance and the solution appliance are manageable by distinct administrators including a system administrator and a solution administrator, respectively.

13. The computer-implemented method of claim 12, further comprising:
  by the solution appliance:
    opening a communication channel with the functional appliance; and receiving status information from the functional appliance;
    wherein the functional appliance is configured to send status information to the solution appliance.

14. The computer-implemented method of claim 12:
  wherein the status change is an offline condition for the functional appliance; and further comprising, by the solution appliance:
    determining a cause of the offline condition;
    determining a time schedule for the offline condition based on the cause of the offline condition; and
    displaying the time schedule for the offline condition on the user interface to indicate a change to the availability of the functional appliance.

15. The computer-implemented method of claim 12, wherein:
  the user interface is a guest user interface; and
  the user interface indicates a change to the availability of a task affected by the functional appliance.

16. The computer-implemented method of claim 12, wherein:
  the user interface is a solution administrator user interface; and
  the user interface is modified to indicate a change to the availability of the functional appliance and at least one task affected by the functional appliance.

17. The computer-implemented method of claim 12, wherein:
  the user interface is for a system administrator; and
  the user interface is modified to indicate at least one user affected by the functional appliance.

18. A computer program product to provide appliance status feedback, the computer program product comprising:
  a non-transitory computer-readable medium having computer-readable program code embodied therewith, the computer-readable program code executable by one or more computer processors to perform an operation comprising:
    administering resources in response to selection of tasks presented on a user interface, the resources including a first resource provided by a functional appliance to a solution appliance for administration, wherein the functional appliance and the solution appliance are manageable by distinct administrators including a system administrator and a solution administrator, respectively;
    assigning the first resource for use by a specified task of a guest user, the guest user having a guest user role that includes permission to use the first resource from the functional appliance;
    assigning, to the guest user role, access to status information of the functional appliance;
    upon receiving an indication of a status change of the functional appliance, accessing a resource map linking the resources to the tasks, in order to identify an impact of the status change; and
    generating an indication of the identified impact of the status change,
  whereafter the indication is output via the user interface.

19. The computer program product of claim 18, the operation further comprising:
  opening a communication channel with the functional appliance; and
  receiving status information from the functional appliance.

20. The computer program product of claim 18, wherein the impact specifies at least one of: (i) one or more impacted tasks and (ii) one or more impacted users, including the guest user; wherein the operation further comprises, prior to receiving indication of the status change:
  upon detecting that the functional appliance is operable to provide the first resource for use by one or more tasks, mapping the first resource to the functional appliance, the one or more tasks including the specified task.

* * * * *